US009878347B2

(12) United States Patent
Russo

(10) Patent No.: US 9,878,347 B2
(45) Date of Patent: Jan. 30, 2018

(54) REFURBISHMENT PROCESS OF THE PUMPING UNIT IN A VOLUMETRIC SCREW COMPRESSOR OF THE 'OIL FREE' TYPE

(71) Applicant: Riem Service s.r.l., Rome (IT)

(72) Inventor: Fabio Russo, Rome (IT)

(73) Assignee: RIEM SERVICE S.R.L., Rome (IT)

( * ) Notice: Subject to any disclaimer, the term of this patent is extended or adjusted under 35 U.S.C. 154(b) by 269 days.

(21) Appl. No.: 14/226,098

(22) Filed: Mar. 26, 2014

(65) Prior Publication Data

US 2014/0295059 A1 Oct. 2, 2014

(30) Foreign Application Priority Data

Mar. 26, 2013 (IT) .............................. MI2013A0452

(51) Int. Cl.

| | |
|---|---|
| ***C08K 3/04*** | (2006.01) |
| ***B05D 1/02*** | (2006.01) |
| ***F04C 2/16*** | (2006.01) |
| ***B05D 3/02*** | (2006.01) |
| ***B05D 3/12*** | (2006.01) |

(52) U.S. Cl.

CPC ............. *B05D 1/02* (2013.01); *B05D 3/0272* (2013.01); *B05D 3/12* (2013.01); *F04C 2/16* (2013.01); *B05D 2506/15* (2013.01); *F04C 2230/80* (2013.01); *F04C 2230/85* (2013.01); *F04C 2230/91* (2013.01)

(58) Field of Classification Search

CPC ........................................................ C08K 3/04

USPC .............................................................. 427/9

See application file for complete search history.

(56) References Cited

U.S. PATENT DOCUMENTS 3,167,439 A * 1/1965 Vukasovich ............ C04B 28/34 106/690

5,363,821 A 11/1994 Rao et al.

5,516,546 A * 5/1996 Hari ........................ C08F 20/14 252/503

6,706,819 B1 * 3/2004 Araki .................... C08F 259/08 525/199

2003/0113221 A1 6/2003 Wagner et al.

2003/0115988 A1 6/2003 Pozarnsky et al.

2003/0121152 A1 7/2003 Johnson

2004/0052649 A1 3/2004 Murase et al.

OTHER PUBLICATIONS

"Z Services Stage Refurbishment Process", Air Hire, XP002716234, Mar. 15, 2010, Retrieved from the Internet on Nov. 12, 2013.

Search Report dated Nov. 12, 2013 issued to the corresponding Italian Patent Application.

* cited by examiner

*Primary Examiner* — Deve E Valdez

(74) *Attorney, Agent, or Firm* — Jacobson Holman, PLLC.

(57) ABSTRACT

A refurbishment process for a volumetric screw compressor of the 'oil-free' type, which comprises a male rotor and a female rotor, is described. The process comprises visually checking the wear condition of the rotors, treating their surface for removing the previous coating, and applying a new coating on the surface. The composition of the coating applied on the surface of the rotors consists of the following materials:

| Material | Amount (g) |
|---|---|
| Polytetrafluoroethylene (954G 303 C Teflon, DuPont) | 750 ÷ 850 |
| Amorphous graphite powder | 300 ÷ 400 |
| Thinner for spray cleaning apparatuses (8595 thinner, DuPont) | 200 ÷ 270 |
| Methyl ethyl ketone (MEK) | 170 ÷ 220 |
| Cellosolve acetate coating additive (Syn Fac 800 resin). | 200 ÷ 300 |

14 Claims, 19 Drawing Sheets

REFURBISHMENT PROCESS OF THE PUMPING UNIT IN A VOLUMETRIC SCREW COMPRESSOR OF THE 'OIL FREE' TYPE

The present invention relates to a refurbishment process of the pumping unit in a volumetric screw compressor of the 'oil-free' type, i.e. without pumping unit lubrication oil.

Many activities in the field of pharmaceutical or food production, in precision electronics or in other sensitive applications require the use of compression units which deliver excellent air quality in order to ensure perfect end products and production processes.

Being specifically developed for applications requiring maximum purity levels, 'oil-free' compressors compress the air without lubrication oil, and thus prevent the introduction of oil into the compression process, thus eliminating the risk of product contamination and alteration, damage to corporate reputation and delays, which are, in turn, cause of further expenses.

Rotary 'oil-free' volumetric compressors are known, in particular of the ZR type made by Atlas Copco, in which the pumping unit comprises a pair of screw-shaped rotors. In such compressors, known as screw compressors, the rotors are externally provided with reversing helical screws and are arranged side by side to mate with each other. By rotating within the cylindrical seats obtained in the pumping unit, the screw rotors create a compartment therebetween and the body in which they are accommodated, which progressively moves from the intake zone to the discharge zone, decreasing the volume and thus compressing the air entrapped between the two rotors and the walls of the compartment. By means of the rotation of the rotors, the volume incorporated between them is reduced, thus increasing the pressure until the air is pushed towards the discharge mouth, and thus ejected.

The absence of the action of a lubricant means that the mechanical parts of the 'oil-free' compressor are inevitably subject to wear. Careful maintenance is needed in order to keep up the performance level in particularly demanding industrial processes, like those listed above. When a pumping unit wear occurs, the only possible solution is to replace the concerned components with new genuine components.

Various documents are known, which illustrate maintenance services for pumping units, such as for example US patent application 2003113221(A1), which describes a treatment of the rotor surfaces so as to reduce the clearance between the surfaces, or the website http://www.airhire.co.uk/acatalog/The_Refurbishment_Process.html, which describes a refurbishment process for screw compressors.

In the light of the prior art, it is the object of the present invention to provide a maintenance service for pumping units of screw compressors of the 'oil-free' type which ensures performances similar to those which would be obtained with genuine spare parts, but with a considerable saving of costs.

In accordance with the present invention, said object is achieved by means of a process for generating the pumping unit of a screw compressor of the 'oil-free' type, as claimed in claim 1.

The features and advantages of the present invention will be apparent from the following detailed description of a practical embodiment thereof, illustrated by way of non-limitative example in the accompanying drawings, in which.

Figure 1:
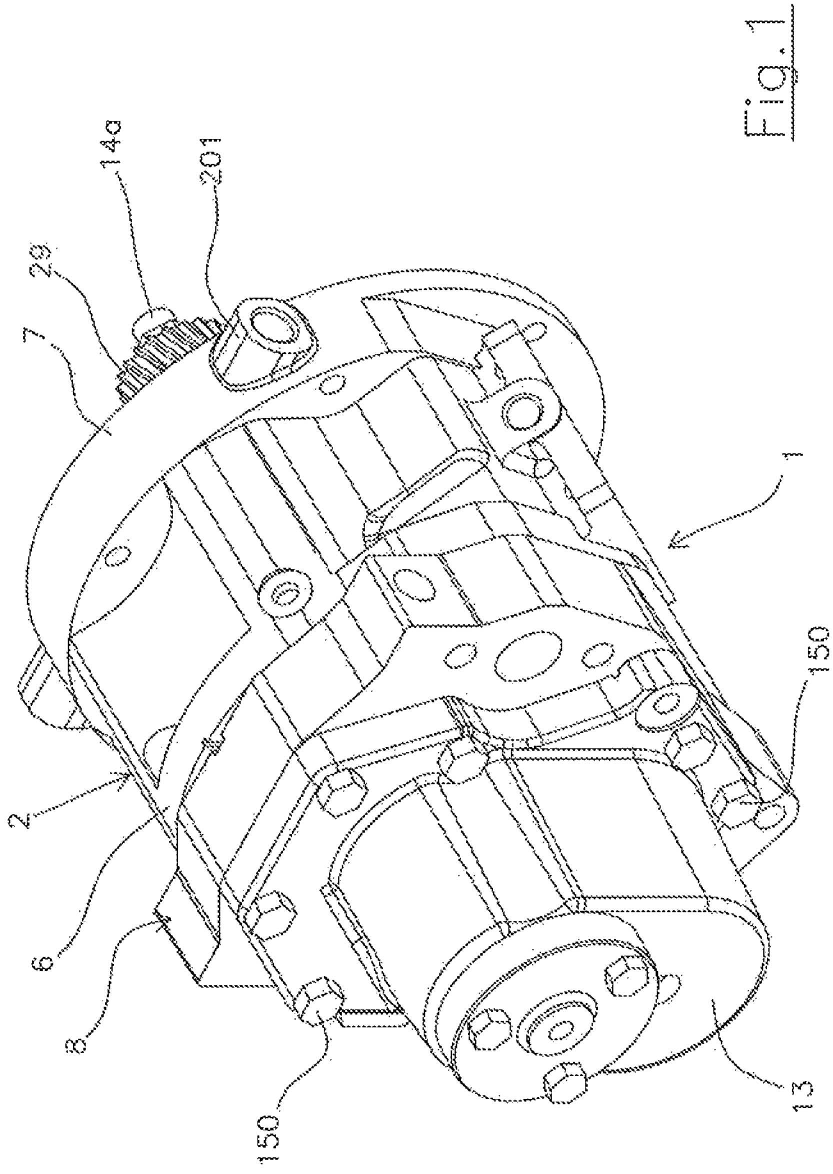
FIG. 1 shows by way of example a perspective overview of a volumetric screw compressor of the 'oil-free' type, to which the refurbishment process of the pumping unit according to the present invention may be applied.
Figure 2:
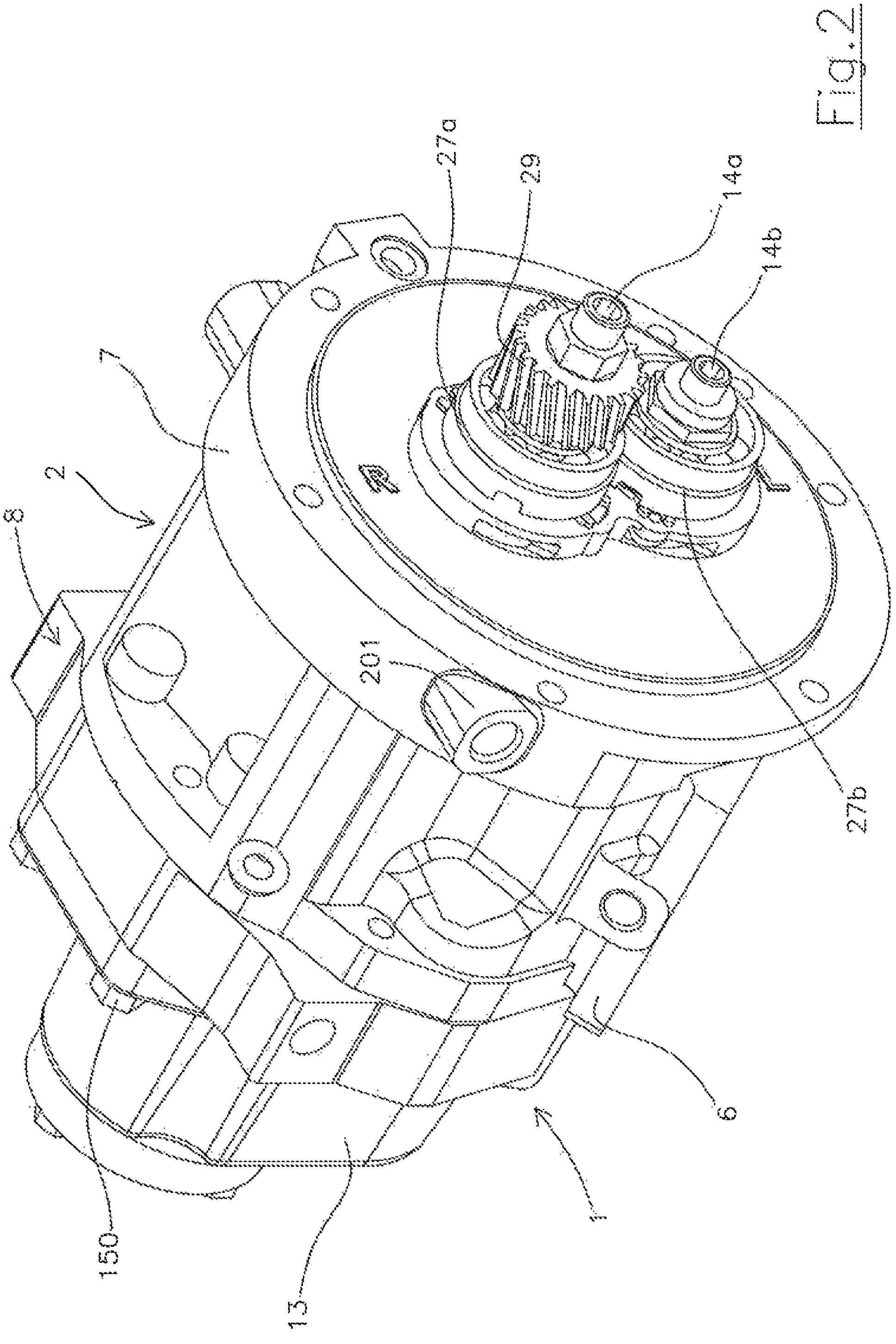
FIG. 2 shows the same compressor according to another perspective.

The figures refer to a typical example of an 'oil-free' screw volumetric compressor, commercially known as ZR compressor made by Atlas Copco, an overview of which is shown in FIGS. 1 and 2, and which is identified as a whole by reference numeral 1.

The refurbishment process according to the present invention can equally be used for other 'oil-free' screw volumetric compressors of the same or other manufacturers.

As shown in FIGS. 1 and 2, compressor 1 comprises a pumping unit 2, a header 8 and a synchronization gear casing 13.

Figure 16:
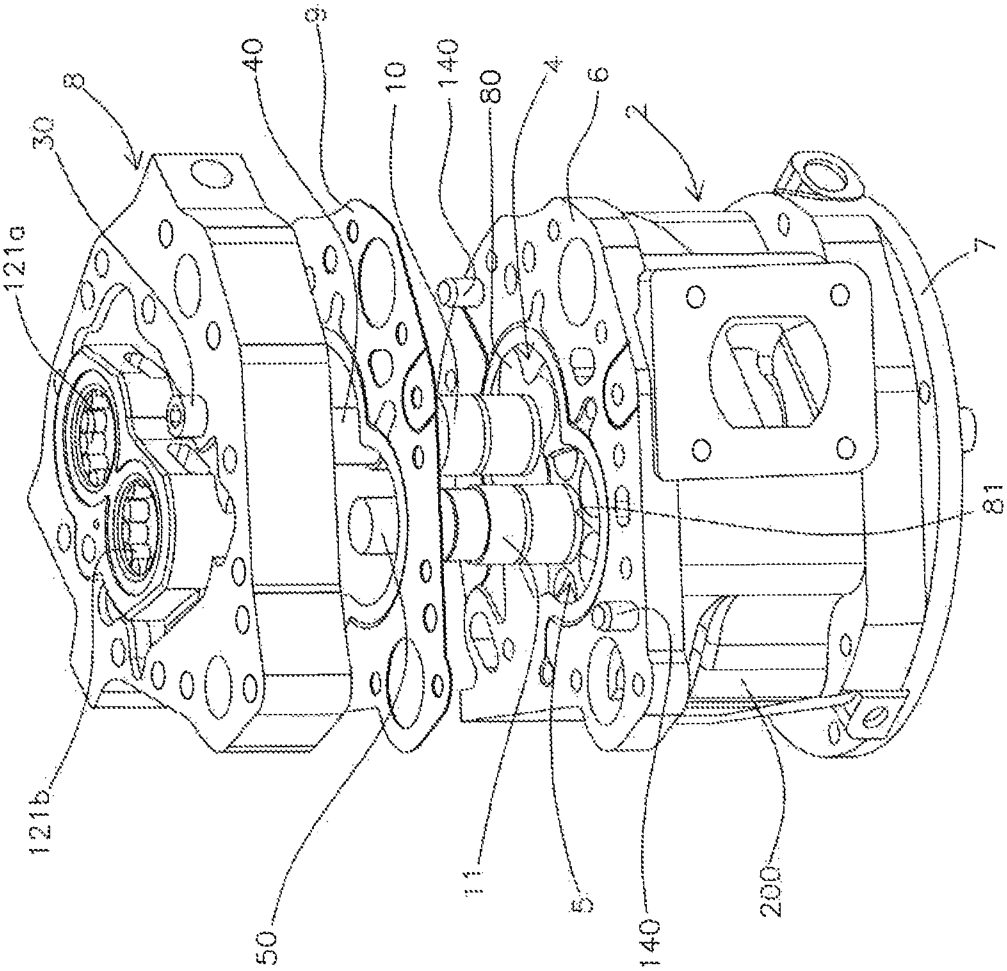
Figure 17:
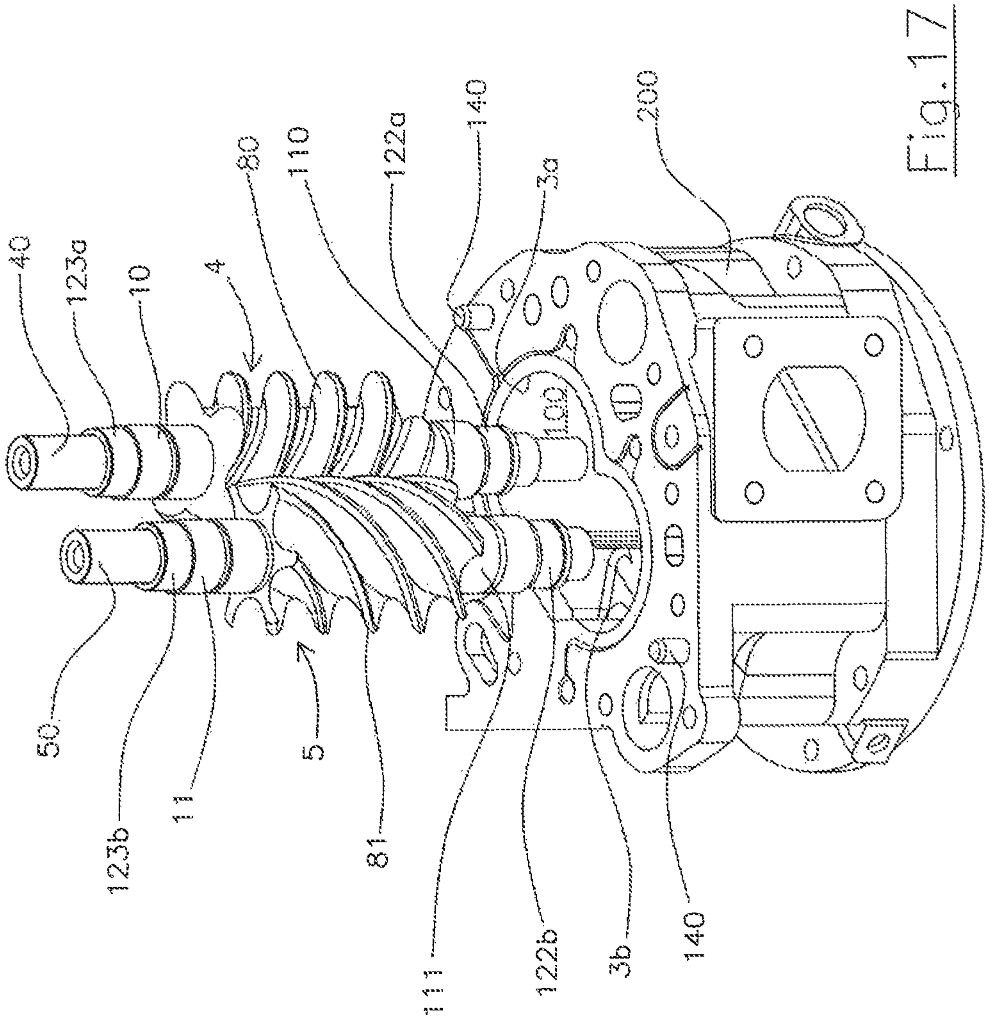

The pumping unit 2 is more clearly shown in FIGS. 16 and 17, where it is shown comprising an outer body 200 and an inner body 100 forming two seats 3*a*, 3*b*, which house respective male 4 and female 5 connectors. The inner chamber 100 includes as a whole a first side opening (not shown in the drawings) adapted to aspirate air, and a second side opening 201 adapted to eject the air, said openings allowing chamber 100 to communicate with the exterior.

The rotors 4, 5 include respective shafts 40, 50 in a single body, which are parallel and appropriately spaced apart from each other, and respective external reversing helical screws 80, 81 which mesh each other and form an air pumping and compression compartment with the inner wall of chamber 100, which compartment extends from the inlet opening to the outlet opening of chamber 100. The helical screws of rotors 4, 5 are typically made of carbon steel C45/C50.

Header 8 is fixed by means of a plurality of screws 30 to a first side 6 of the body 200 of the pumping unit 2, commonly known as low-pressure side. A seal 9 (FIG. 15) and centering pins 140 (FIGS. 1-9, 16 and 17) are interposed between header 8 and the side 6 of body 200.

Figure 9:
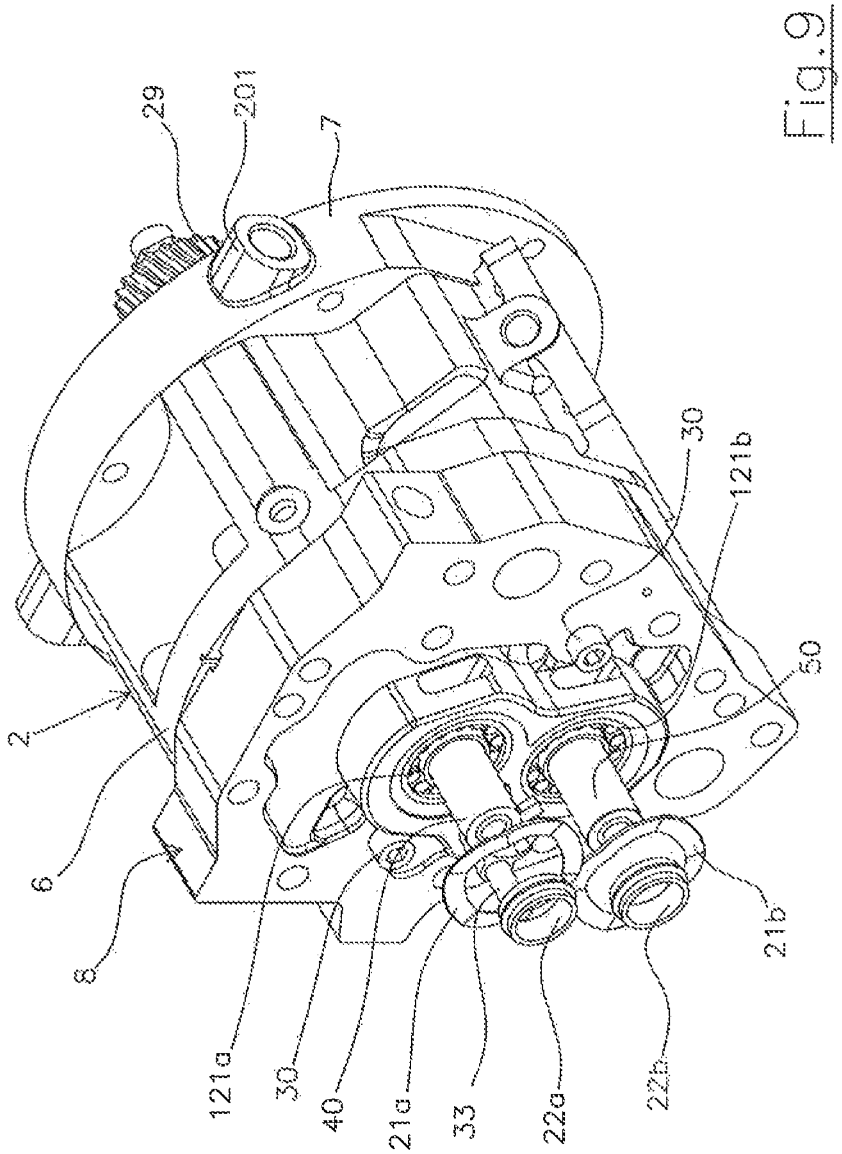

Two sealing assembles 10 and 11 are accommodated in respective seats in header 8 and are surmounted by respective radial bearings 121*a* and 121*b*, in which a respective end of the shafts 40, 50 of rotors 4, 5 is inserted (FIGS. 9 and 16).

Figure 4:
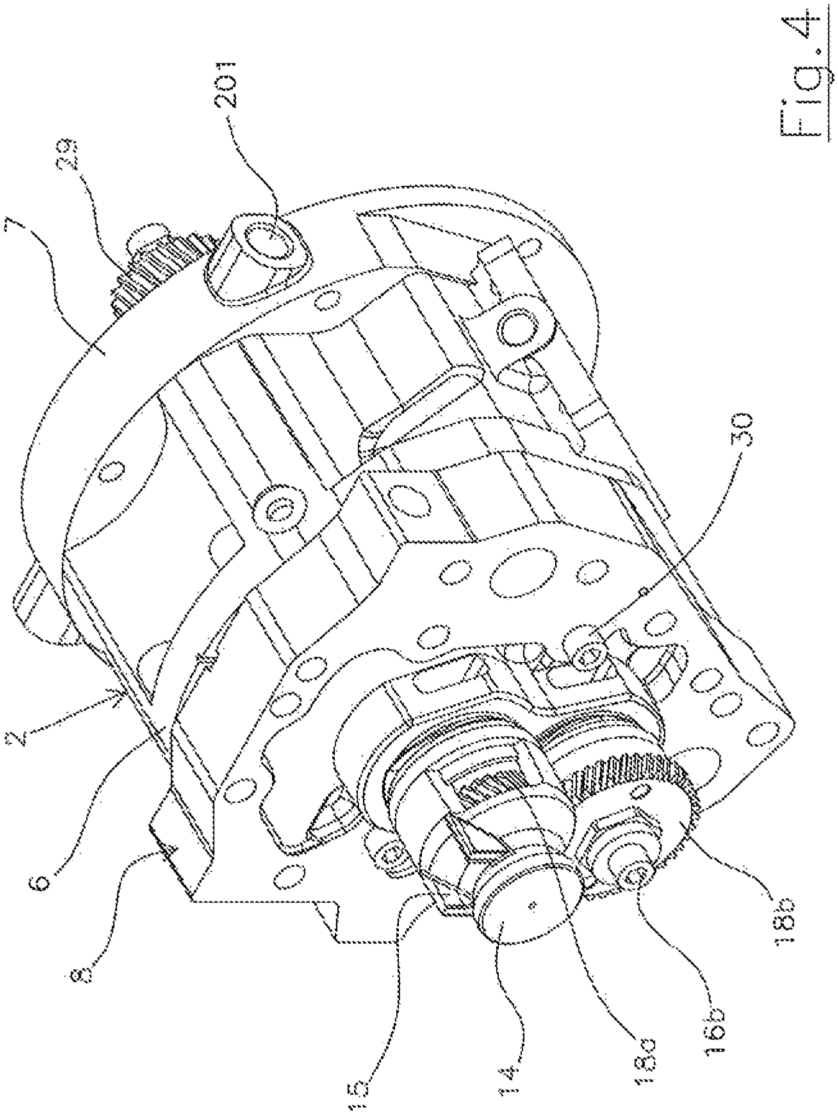
Figure 5:
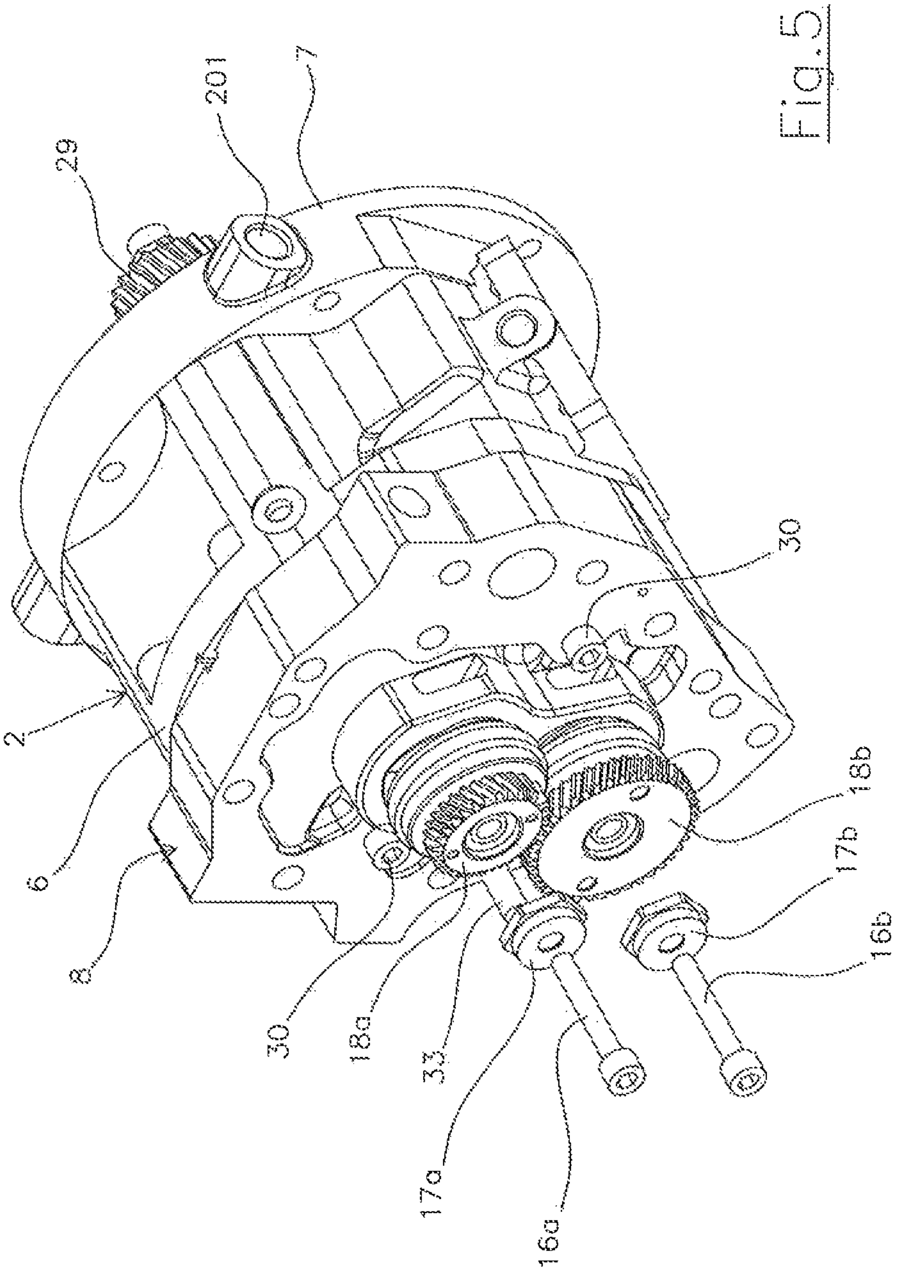
Figure 6:
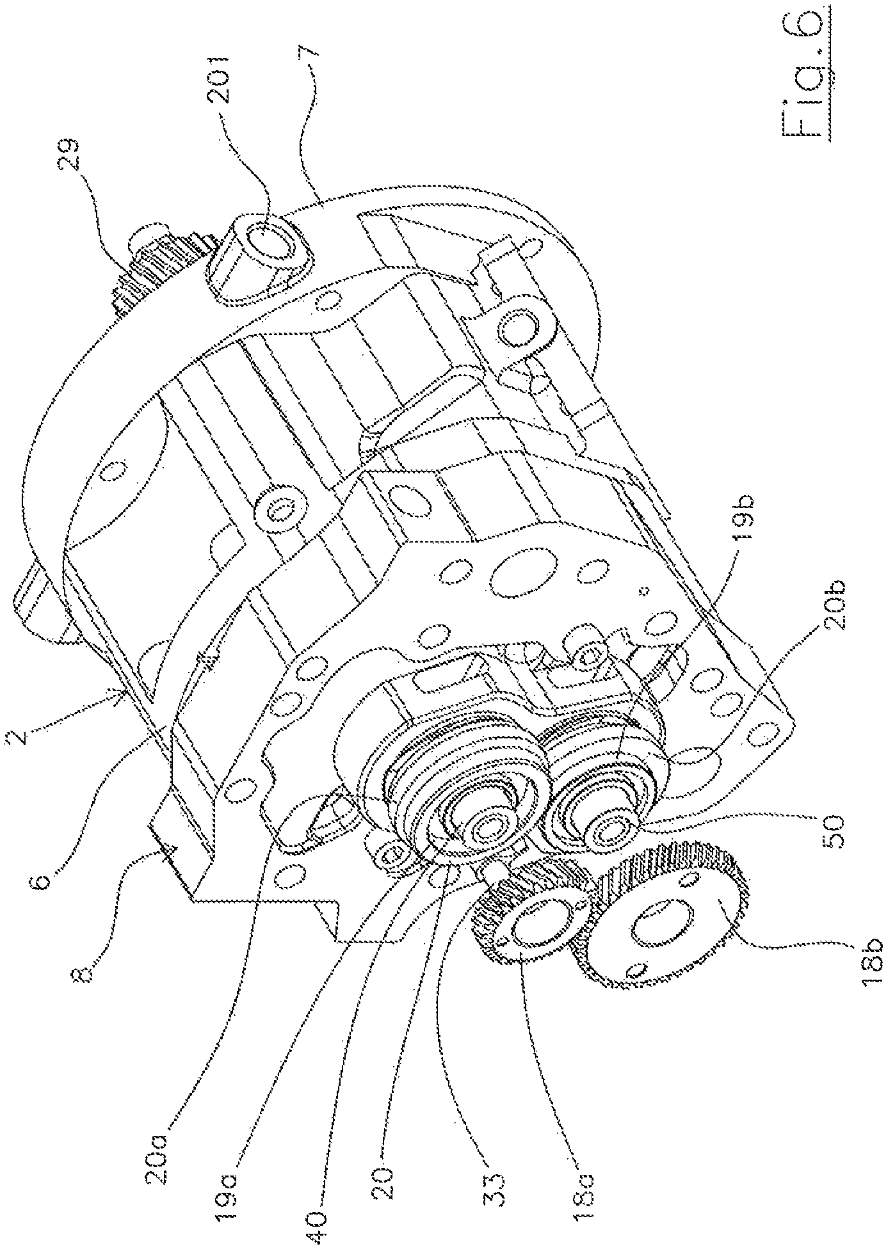
Figure 7:
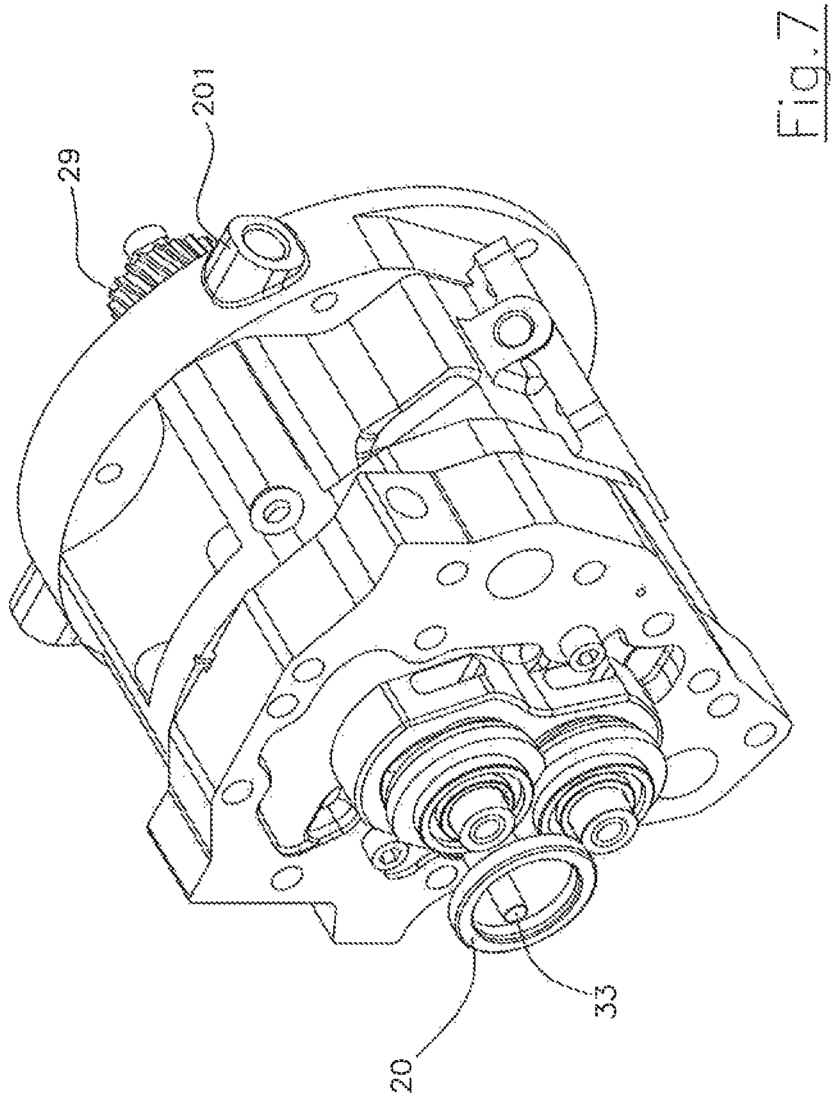
Figure 8:
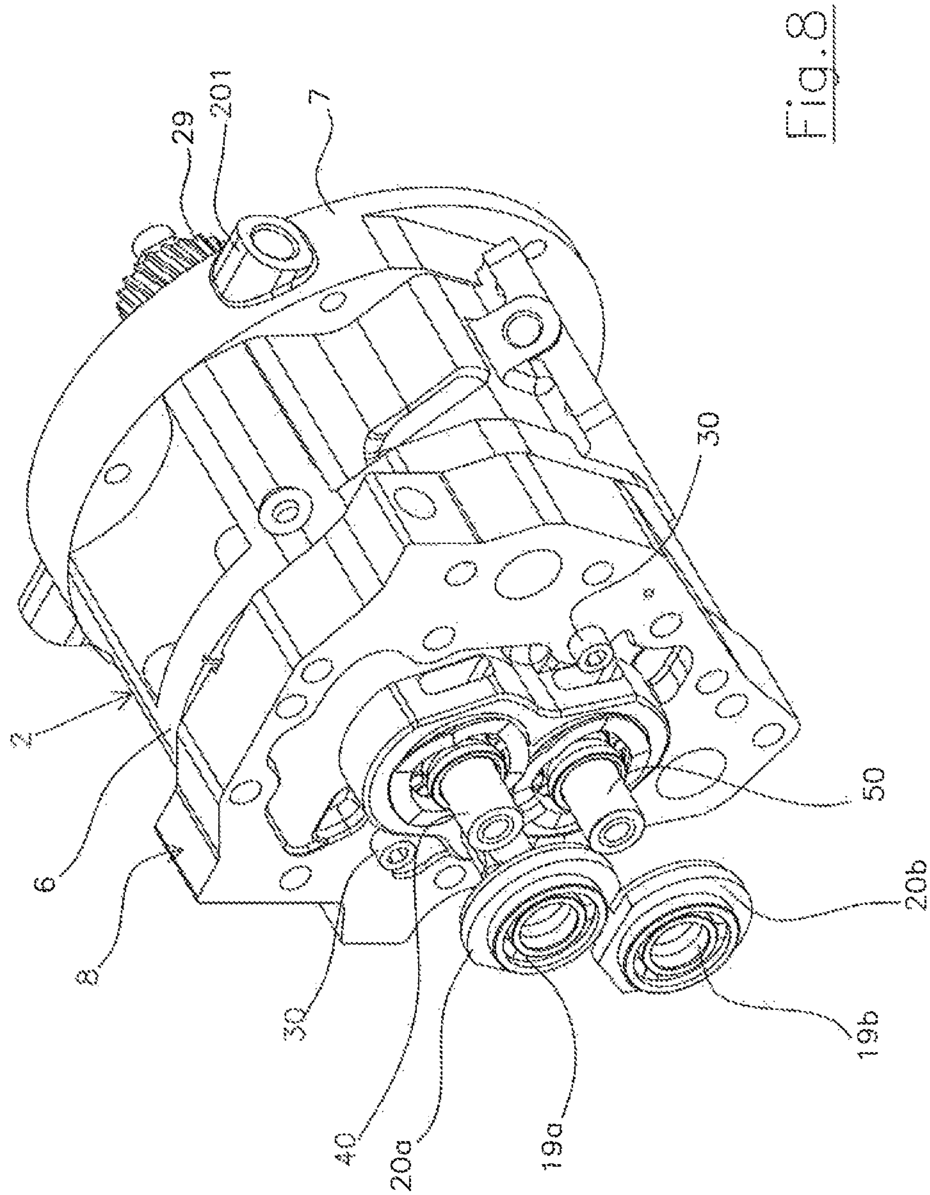
Figure 14:
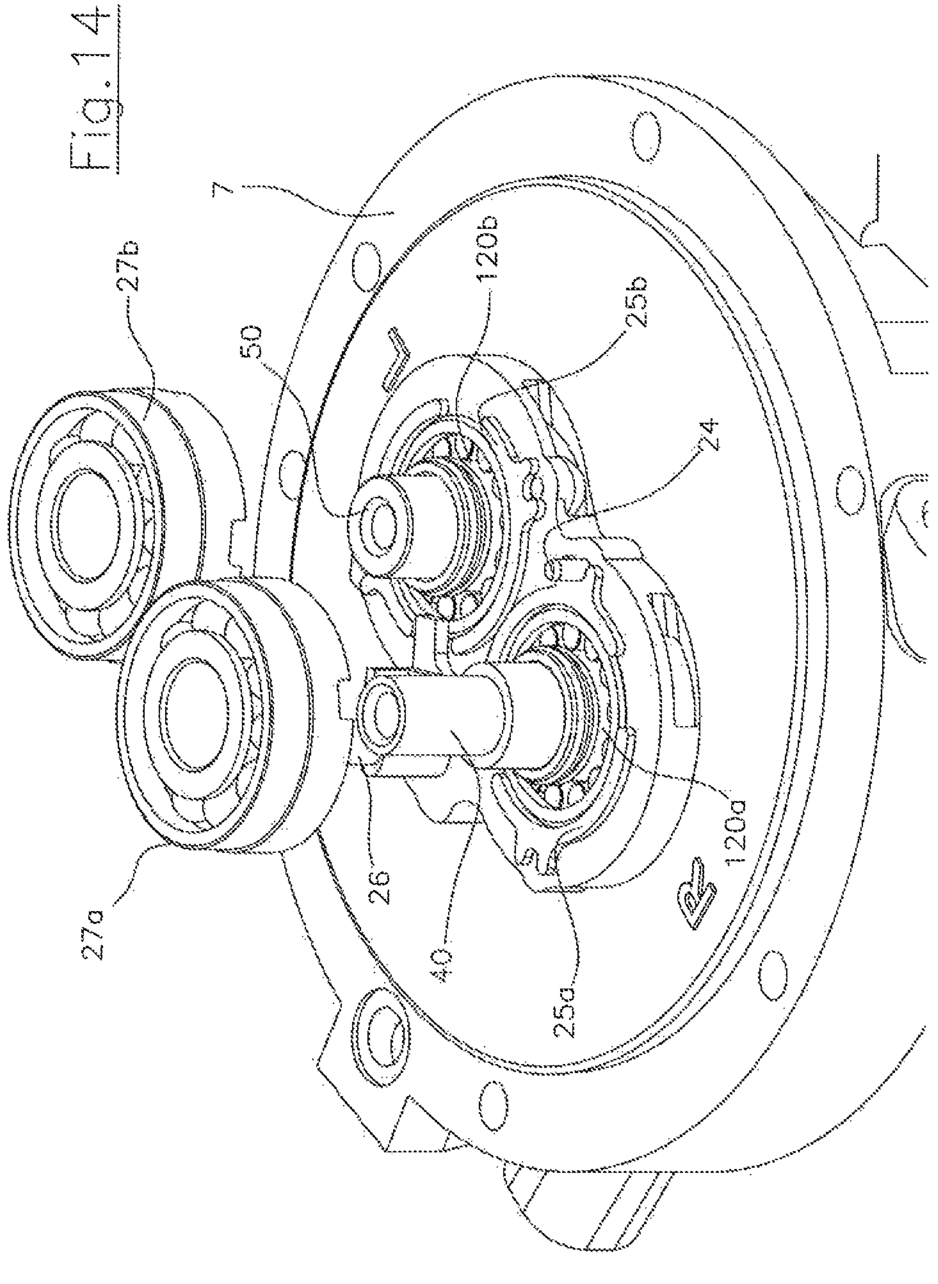
Figure 18:
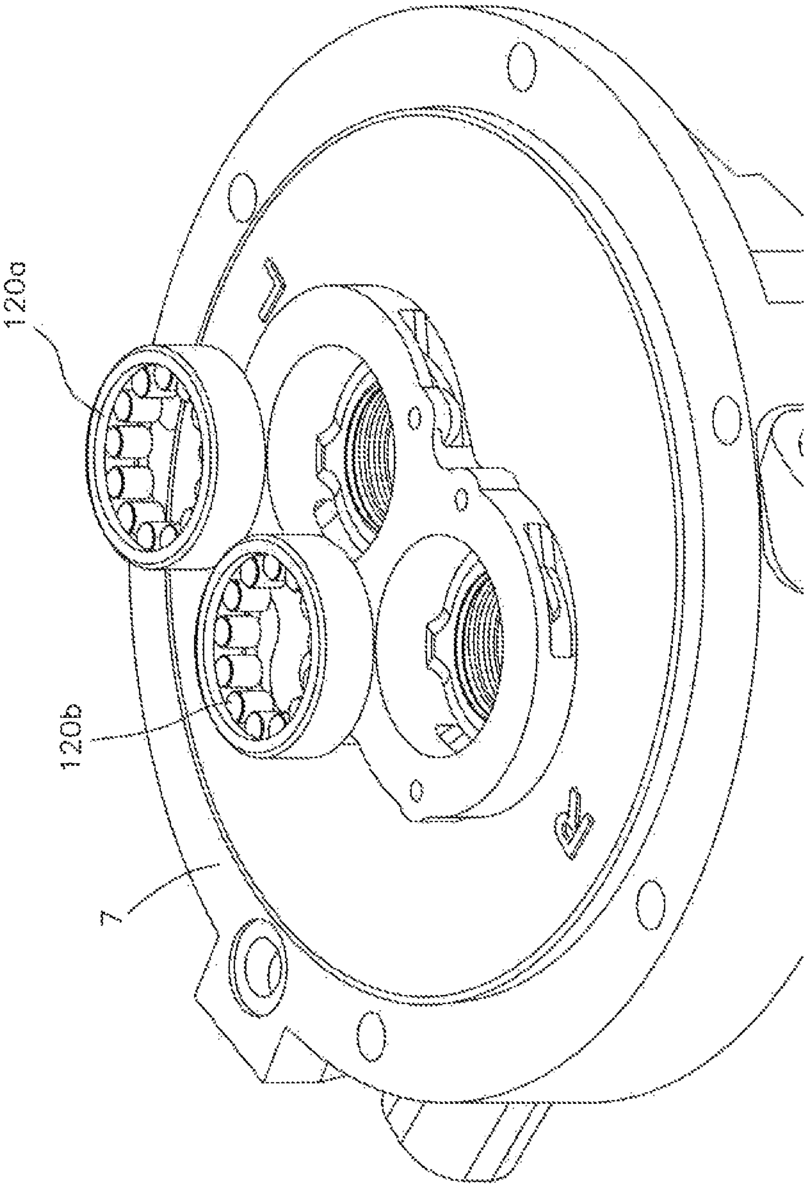
Figure 19:
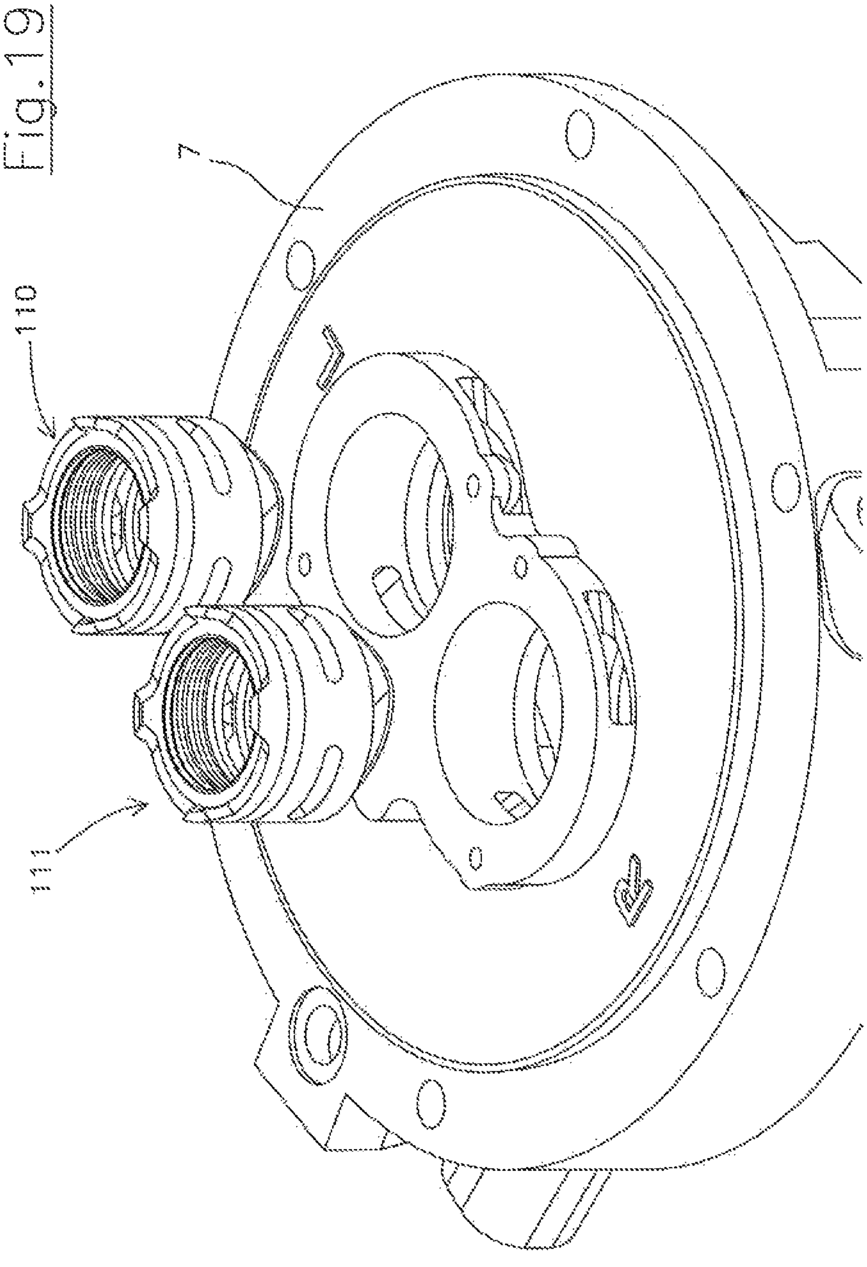

Similarly, on a second side 7 of the body 200 of the pumping unit 2, commonly known as high-pressure side 7, two sealing assemblies 110 and 111 (FIG. 19), surmounted by respective radial bearings 120*a* and 120*b* (FIGS. 14, 15 and 18), receive other ends of the shafts 40, 50 of the rotors 4, 5. The rotation of the rotors 4, 5 is allowed by coupling the respective shafts 40, 50 with each pair of hearings 121*a*, 120*a* and 121*b*, 120*b* (FIGS. 4 and 5).

A plurality of elements are inserted over bearing 121*a* through a first end of shaft 40, in particular that coupled to bearing 121*a* on the low-pressure side 6, respectively: a compression spring 21*a*, an axial spacer 22*a*, a resting ring 20, a radial bearing 19*a* with bearing holder 20*a*, a synchronization gear 18*a* and a further spacer 17*a*. A screw 16*a*, inserted into the end of shaft 40, is adapted to lock the aforesaid plurality of elements and is surmounted by a compensation assembly formed by a tablet 14 and a spacer 15.

A plurality of elements are inserted over bearing 121*b* through a first end of shaft 50, in particular that coupled to bearing 121*b* on the low-pressure side 6, respectively: a compensation spring 21*b*, an axial spacer 22*b*, a radial bearing 19*b* with bearing holder 20*b*, a synchronization gear

18*b* and a further spacer 17*b*. A screw 16*b*, inserted into the end of shaft 50, is adapted to lock the aforesaid plurality of elements.

An oil injector 33 (FIGS. 5-7 and 9) lubricates the synchronization gears 18*a* and 18*b* without concerning the pumping unit 2 by virtue of the presence of the sealing assemblies 10 and 11.

The synchronization gear casing 13 (with seal, not shown in the drawings) is fixed to header 8 by means of a plurality of screws 150 so as to cover all the external components with respect to the low-pressure side 6 of the pumping unit 2.

A plurality of elements are inserted over bearing 120*a* through a second end of shaft 40, in particular that coupled to bearing 120*a* on the high-pressure side 7, respectively: a spacer 28*a*, a calibrated shim 25*a*, a flexible pin 24*a*, an angular contact bearing 27*a*, a control gear 29 and a spacer 23*a*. A screw 14*a*, inserted into the end of shaft 40, is adapted to lock the aforesaid plurality of elements.

A plurality of elements are inserted over bearing 120*a* through a second end of shaft 50, in particular that coupled to bearing 120*b* on the high-pressure side 7, respectively: a spacer 28*b*, a calibrated shim 25*b*, a flexible pin 24*b*, an angular contact bearing 27*b* and a spacer 23*b*. A screw 14*a*, inserted into the end of shaft 40, is adapted to lock the aforesaid plurality of elements.

An oil injector 26 lubricates gear 29 without concerning the pumping unit 2 by virtue of the presence of the sealing assemblies 110 and 111.

When worn, the pumping unit 2 can be refurbished by using the process according to the present invention.

Figure 3:
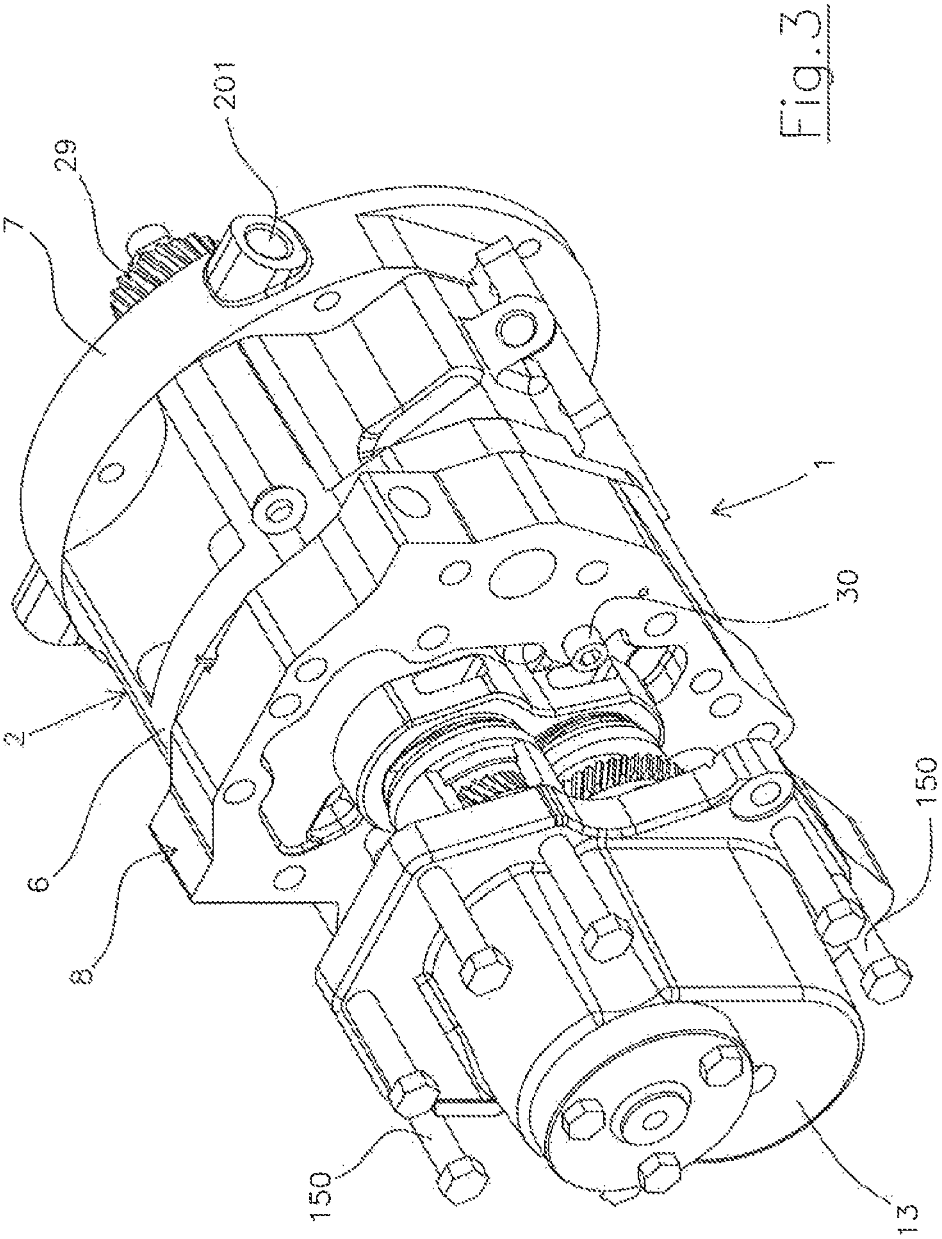
FIGS. 3-19 show a sequence of operating steps of the process according to the invention, when used by way of example for refurbishing the pump unit of the compressor in FIG. 1.

The process initially requires to visually check the wear of bearings 27*a*, 27*b* on the high-pressure side 7. Once compressor 1 has been stably fixed to a work bench, it can start being disassembled by removing the screws 150 and then extracting the casing 13 and the respective seal (FIG. 3).

The compensation assembly, consisting of a tablet 14 and a spacer 15, is then removed (FIG. 4), allowing to loosen the fastening screws 16*a*, 16*b* of the synchronization gears of both shafts 40, 50 for removing the spacers 17*a*, 17*b* (FIG. 5).

The synchronization gears 18*a*, 18*b* (FIG. 6), the resting ring 20 (FIG. 7), the bearings 19*a*, 19*b* with respective bearing holder 20*a*, 20*b* (FIG. 8) and finally the compensation springs 21*a*, 21*b* and the axial extractor.

Figure 10:
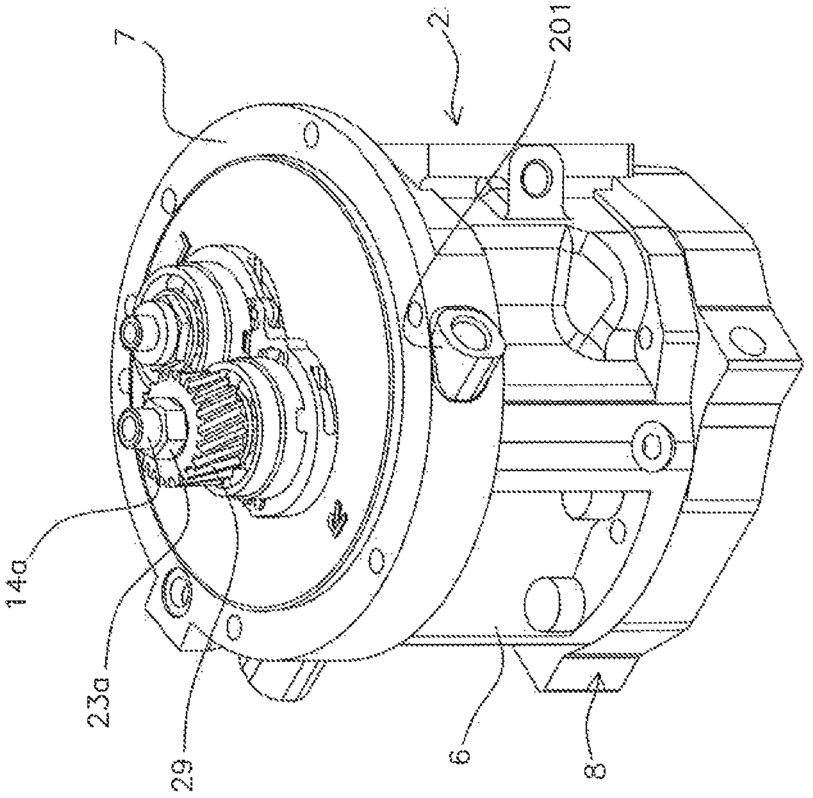
Figure 11:
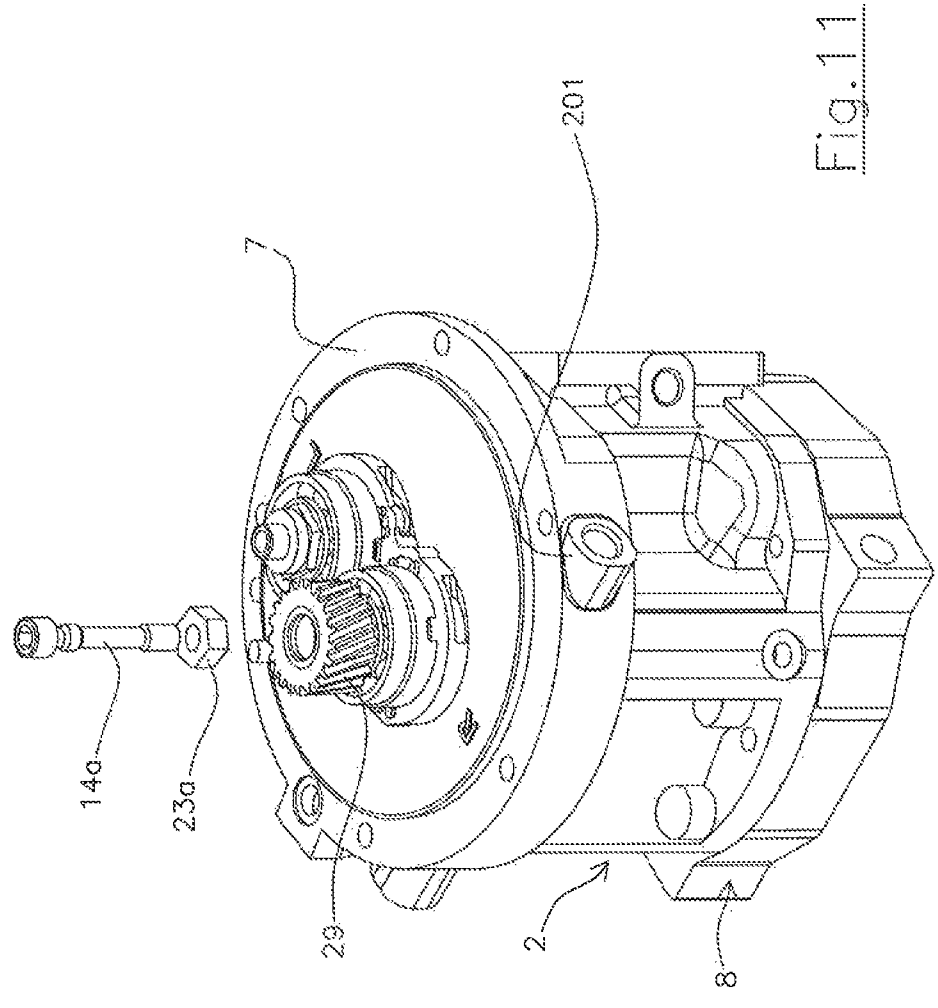
Figure 12:
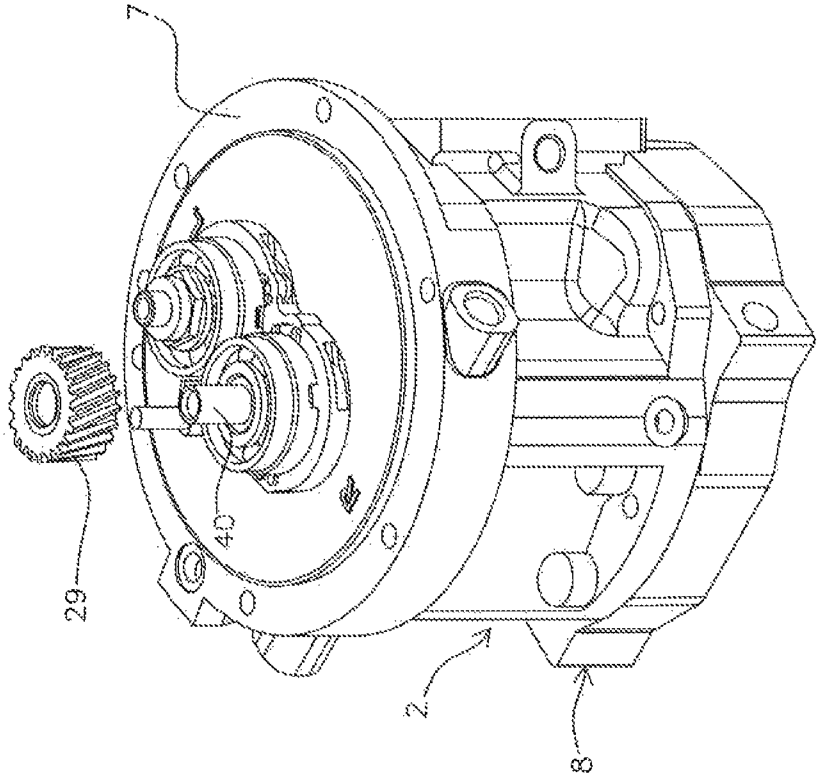

At this point, the pumping unit 2 with header 8 is rotated to face the high-pressure side 7 upwards (FIG. 10). The fastening screw 14*a* of gear 29 (FIG. 11) is loosened, and the spacer 23*a* (FIG. 11) and the gear 29 of shaft 40 (FIG. 12) are removed.

The coaxial rotation of the rotors 4, 5 is verified with a dial gauge, checking clearance and any misalignment of the bearings.

Figure 13:
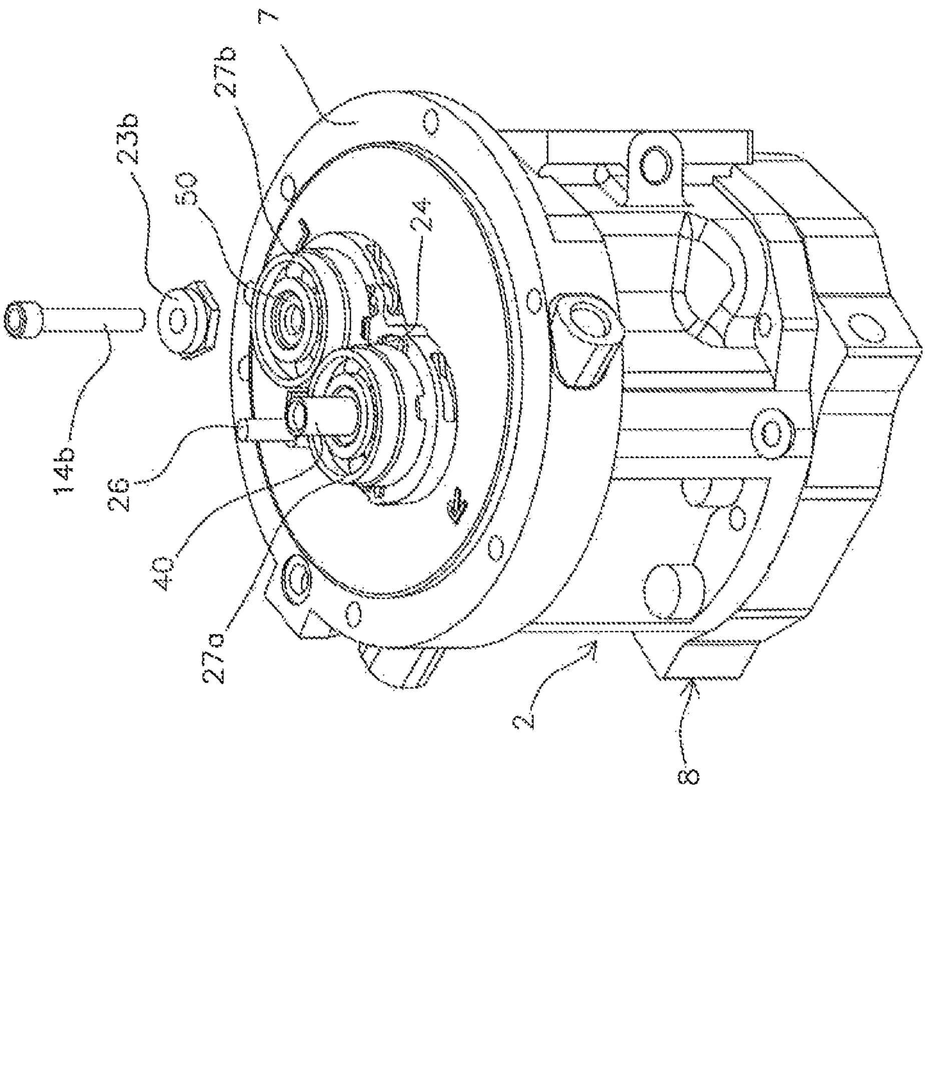
Figure 15:
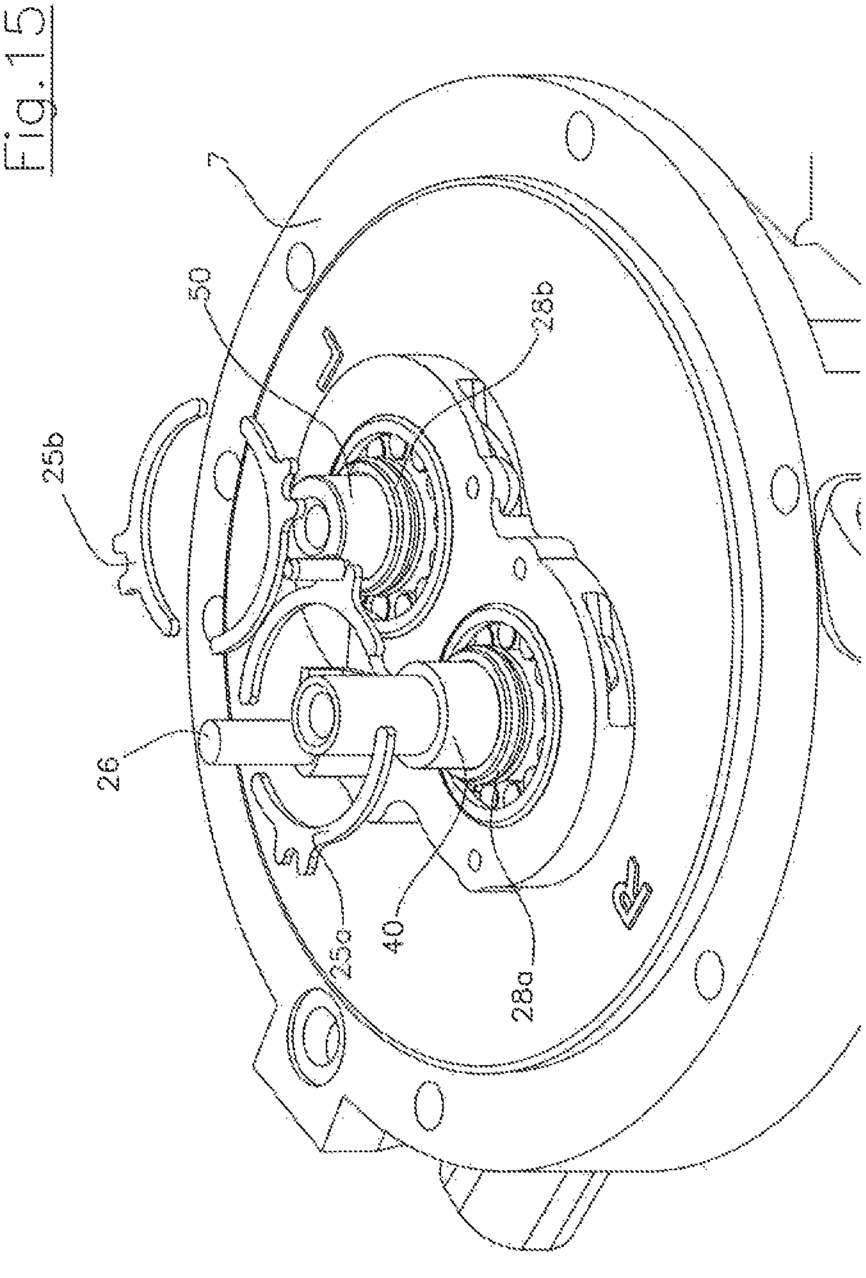

The fastening screw 14*b* and spacer 23*b* (FIG. 13) are then removed and the angular contact bearings 27*a*, 27*b* (FIG. 14) are removed with an appropriate extractor, followed by the flexible pins 24, the calibrated shims 25*a*, 25*b*, the oil injector 26 and the spacers 28*b*, 28*b* (FIG. 15).

At this point, the assembly is rotated to arrange the low-pressure side 6 facing upwards again. Once the fastening screws 30 of header 8 have been loosened on the low-pressure side 6 of the pumping unit 2, it is possible to extract header 8 (FIG. 16), including the bearings 121*a*, 121*b*. Seal 9 is eliminated and replaced during reassembly. The oil injector 33 is also removed.

The rotors 4, 5 are extracted one at a time with a roto-translating motion (FIG. 17) with great care and being careful to prevent contacts between them and the seats 3*a*, 3*b* of chamber 100.

Once the pumping unit 21 has been tipped again, the bearings 120*a*, 120*b* (FIG. 18) and the sealing assemblies 110, 111 (FIG. 19) are removed from the high-pressure side 7 with the aid of an appropriate extractor. The same operation is carried out on header 8, by removing the bearings 12*a*, 12*b* and the sealing assemblies 10, 11.

The four sealing assemblies 10, 11, 110 and 111 are then disassembled and the state of components is checked.

The wear condition of the profiles of the rotors 4 and 5 is visually checked to evaluate the refurbishment feasibility thereof. The rotors must be handled with care being careful not to cause shocks and/or stress of any type.

If the profiles are worn, the rotors can either be replaced or conservatively overhauled according to the present invention.

Firstly, the inner rings 122*a*, 122*b*, 123*a*, 123*b* of the bearings 120*a*, 120*b*, 121*a*, 121*b* are removed (FIG. 17), and then the previous coating is removed from both the helical springs 80, 81 and the shafts 40, 50 of the rotors 4, 5.

A preliminary treatment is carried out before applying the new coating, which consists in sandblasting the rotor surfaces 4, 5 using fine grain corundum in order to increase roughness and promote wettability. After such an operation, the rotors are degreased with a thinner (e.g. acetone) and dried in appropriate ovens at 50°/60° C. so as to completely evaporate the thinner. Checking that the temperature is not higher than 40° C. before application is needed.

At this point, a new coating according to the invention is applied on the surface of the helical screws of the rotors 4, 5.

The composition of the new coating according to the present invention consists of the following materials:

| Material | Amount (g) |
|---|---|
| Polytetrafluoroethylene (954G 303 C Teflon, DuPont) | 750 + 850 |
| Amorphous graphite powder | 300 + 400 |
| Thinner for spray cleaning apparatuses (8595 thinner, DuPont) | 200 + 270 |
| Methyl ethyl ketone (MEK) | 170 + 220 |
| Cellosolve acetate coating additive (Syn Fac 800 resin) | 200 + 300 |

For example, a particular formulation of the new coating may be as follows:

| Material | Amount (g) |
|---|---|
| Polytetrafluoroethylene (954G 303 C Teflon, DuPont) | 800 |
| Amorphous graphite powder | 360 |
| Thinner for spray cleaning apparatuses (8595 thinner, DuPont) | 240 |
| Methyl ethyl ketone (MEK) | 195 |
| Cellosolve acetate coating additive (Syn Fac 800 resin | 240 |

The various materials are mixed for about four hours with a slow gear system, which is capable of eliminating any clots or traces of graphite in suspension and does not create thermal imbalance in the mixture (grinding generates heat, which evaporates the MEK as it is highly volatile).

At this point, the coating is sprayed by means of a dry compressed air gun onto the helical screws 80, 81 of the rotors 4, 5, protecting the coupling surface with the bearings. They are then pre-cured at 60°/70° C. for about 30 minutes, and the quality and thickness of the paint coating is checked by means of an appropriate ultrasound instrument. The typical thickness is from 70 to 100 μm.

The shafts 40, 50 of the two rotors are spray-coated by means of a common PFTE (polytetrafluoroethylene) based coating.

The rotors 4, 5 are then put back into the ovens and cured by means of a temperature ramp up to 230° C. for about 30/45 minutes. Before extracting the rotors 4, 5 from the ovens, it is necessary to wait for the temperature to decrease uniformly for an optimal paint coating quality.

It is then checked that the water passages inside body 200 of the pumping unit 2 are free from build-ups or foreign bodies, and that the lubrication and cooling conduits in the pumping unit and in header 8 are clean. Once this check has been completed, the operations of coating removal, preparation and painting are repeated on the body 200 of the pumping unit 2, and on header 8.

Compressor 1 is now reassembled. The sealing assemblies 10, 11 and 110, 111 are refitted with the assistance of a small press in header 8 and on the high-pressure side 7, respectively, paying attention to the correct positioning of the right and left assemblies, intended to receive the coated shafts 40, 50. The same also occurs for both pairs of bearings 121*a*, 121*b* and 120*a*, 120*b*. The oil injectors 26, 33 are refitted.

With the opening of the compression chamber 100 facing upwards, the male rotor 4 is inserted into its respective seat 3*a*, delicately rotated to test the lack of interference and then extracted again. In the case of interference/excessive resistance to rotation, the coating thicknesses are checked again and possibly modified. The same operation is carried out on the female rotor 5 in the respective seat 3*b*. The two rotors 4, 5 and the respective helical screws 80, 81 are meshed and inserted into seats 3*a*, 3*b*, and are delicately rotated to test for lack of interference once again. The shafts 40, 50 under the helical screws 80, 81 engage the sealing assemblies 110, 111.

At this point, the low-pressure header 8 is fitted once a new seal 9 and the respective centering pins 140 have been inserted.

The rotors are manually rotated again to test for lack of interference and then the fastening screws 30 are inserted into header 8. The compensation springs 21*a*, 21*b* and the axial spacers 22*a*, 22*b* are then inserted.

The assemblies 19*a*, 19*b* are inserted with the aid of a small press and the resting ring 20 of the compensation assembly 15 is inserted on the male rotor 4.

The synchronization gears 18*a*, 18*b* are inserted after induction heating on the male rotor 4, and a service bushing on the female rotor 5, and then the spacers 17*a*, 17*b* are inserted and the screws 16*a*, 16*b* are fastened over the respective shafts 40, 50 of the rotors 4, 5.

At this point, the pumping unit 1 is rotated to arrange the high-pressure side 7 facing upwards. The spacers 28*a*, 28*b* and the angular contact bearing 27*a*, 27*b* are inserted with the aid of a small press.

A service bushing instead of gear 29 is inserted on the male rotor 4, and spacer 23*a* is then inserted and thus the fastening screw 14*a* is tightened. Similarly, spacer 23*b* is inserted on the female rotor 5 and screw 14*b* is inserted. The flexible pins 24*a*, 24*b* are then driven.

Coaxial rotation of the rotors is evaluated with the aid of a dial gauge, thus testing the clearance or misalignments of the radial bearings 12.

At this point, compressor 1 is turned upside down and the service bushing on the female rotor 5 is replaced with the respective synchronization gear 18*b* by removing and re-inserting spacer 17*b* and screw 16*b*.

The compensation assembly 14, 15 is reassembled on the male rotor 4, lastly followed by the synchronization gear casing 13 which is reassembled on the low-pressure side 6.

The invention claimed is:

1. A new coating for a refurbishment process of an oil-free volumetric screw compressor comprising a pumping unit with an outer body and an inner chamber comprising a first and a second seat adapted to accommodate respective male and female rotors provided with respective reversing helical screws meshing each other, said process comprising gradually disassembling the components of the compressor up to extraction of a rotor at a time from the respective seats of the chamber, visually checking the wear condition of the rotors, treating the rotor surface to remove the previous coating, applying said new coating on the surface of the rotors, repeating the operations of treating and applying a coating on the outer body of the pumping unit, inserting and then extracting one rotor at a time into the respective seat and checking for lack of interference, reassembling the pumping unit by meshing and inserting the two rotors inside the seats with further checking for lack of interference, reassembling the remaining components of the compressor, wherein said new coating consists of a mixture of the following materials:

| Material | Amount (g) |
|---|---|
| Polytetrafluoroethylene | 750-850 |
| Amorphous graphite powder | 300-400 |
| Thinner for spray cleaning apparatuses | 200-70 |
| Methyl ethyl ketone | 170-220 |
| Cellosolve acetate coating additive. | 200-300 |

2. The new coating according to claim 1 for a process as defined above, wherein said treatment of the rotor surface comprises a sandblasting process adapted to increase roughness and promote wettability, a degreasing process by means of a thinner, and finally a drying process adapted to evaporate the thinner in appropriate ovens.

3. The new coating according to claim 2 for a process as defined above, wherein fine grain corundum is used in said sandblasting process.

4. The new coating according to claim 1, wherein it is applied by means of a dry compressed air gun adapted to spray the coating on the rotors, the rotors with coating are pre-cured in appropriate ovens, the quality and thickness of the paint coating is checked by means of an appropriate ultrasound instrument, the rotors inside the ovens are cured by means of a temperature ramp up and cooled at uniform temperature for an optimal paint coating quality.

5. The new coating according to claim 1, wherein its formulation is a mixture of the following materials:

| Material | Amount (g) |
|---|---|
| Polytetrafluoroethylene | 800 |
| Amorphous graphite powder | 360 |
| Thinner for spray cleaning apparatuses | 240 |
| Methyl ethyl ketone (MEK) | 195 |
| Cellosolve acetate coating additive. | 240 |

6. The new coating according to claim 1, wherein said materials are mixed for about four hours using a low speed gear system.

7. A coating for refurbishing an oil-free a-volumetric screw compressor, wherein the coating consists of a mixture of the following materials:

| Material | Amount (g) |
|---|---|
| Polytetrafluoroethylene | 750-850 |
| Amorphous graphite powder | 300-400 |
| Thinner for spray cleaning apparatuses | 200-270 |
| Methyl ethyl ketone | 170-220 |
| Cellosolve acetate coating additive | 200-300. |

8. The coating according to claim 7, wherein the coating is a mixture of the following materials:

| Material | Amount (g) |
|---|---|
| Polytetrafluoroethylene | 800 |
| Amorphous graphite powder | 360 |
| Thinner for spray cleaning apparatuses | 240 |
| Methyl ethyl ketone | 195 |
| Cellosolve acetate coating additive | 240. |

9. A refurbishment process of an oil-free volumetric screw compressor, said compressor comprising a pumping unit with an outer body and an inner chamber, comprising a first and a second seat adapted to accommodate respective male and female rotors provided with respective reversing helical screws meshing each other, said process comprising gradually disassembling the components of the compressor up to extraction of a rotor at a time from the respective seats of the chamber, visually checking the wear condition of the rotors, treating the rotor surface to remove the previous coating, applying a new coating on the surface of the rotors, repeating the operations of treating and applying a coating on the outer body of the pumping unit, inserting and then extracting one rotor at a time into the respective seat and checking for lack of interference, reassembling the pumping unit by meshing and inserting the two rotors inside the seats with further checking for lack of interference, reassembling the remaining components of the compressor, said process being wherein the composition of the coating applied on the surface of the rotors consists of a mixture of the following materials:

| Material | Amount (g) |
|---|---|
| Polytetrafluoroethylene | 750-850 |
| Amorphous graphite powder | 300-400 |
| Thinner for spray cleaning apparatuses | 200-270 |
| Methyl ethyl ketone | 170-220 |
| Cellosolve acetate coating additive. | 200-300 |

10. The process according to claim 9, wherein said treatment of the surface of the rotors comprises a sandblasting process adapted to increase roughness and promote wettability, a degreasing process by means of a thinner, and finally a drying process adapted to evaporate the thinner in appropriate ovens.

11. The process according to claim 10, wherein fine grain corundum is used in said sandblasting process.

12. The process according to claim 9, wherein applying the coating comprises painting by means of a dry compressed air gun adapted to spray the coating on the rotors, pre-curing the rotors with coating in appropriate ovens, checking the quality and thickness of the paint coating by means of an appropriate ultrasound instrument, curing the rotors inside the ovens by means of a temperature ramp up and cooling the rotors at uniform temperature for an optimal paint coating quality.

13. The process according to claim 9, wherein the formulation of said coating applied on the surface of the helical screws is a mixture of the following materials:

| Material | Amount (g) |
|---|---|
| Polytetrafluoroethylene | 800 |
| Amorphous graphite powder | 360 |
| Thinner for spray cleaning apparatuses | 240 |
| Methyl ethyl ketone | 195 |
| Cellosolve acetate coating additive. | 240 |

14. The process according to claim 9, wherein said materials are mixed for about four hours using a low speed gear system.

* * * * *